United States Patent Office 3,280,139
Patented Oct. 18, 1966

---

3,280,139
SUBSTITUTED NITROIMIDAZOLES
Josef Klosa, Berlin-Zehlendorf, Germany, assignor to Delmar Chemicals Limited, Lachine, Quebec, Canada, a corporation of Canada
No Drawing. Filed Mar. 29, 1963, Ser. No. 269,176
Claims priority, application Germany, Apr. 6, 1962, K 46,397
2 Claims. (Cl. 260—309)

This invention relates to novel substituted nitroimidazoles. More particularly, it relates to 1-(β-hydroxalkyl)-2-substituted and unsubstituted-4-nitroimidazole molecules conforming to the general Formula I:

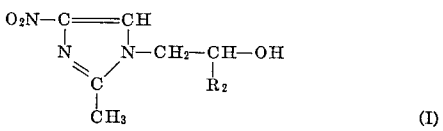

wherein $R_2$ represents a chloro-methyl group or a phenyl group.

The compounds possess valuable chemotherapeutic properties. They were found to be active against pathogenic protozoa, such as, for example, trichomonas, such as trichomonas vaginalis. At the same time these compounds possess a very low toxicity. They were well tolerated in rats at daily doses of 500, 200 and 75 mg. per kilogram over a period of ten weeks.

Substances of the aforesaid formula have heretofore not been described. It is therefore an object of the present invention to provide a new group of nitroimidazole derivatives and a simple method for their preparation.

Another object of the present invention is to provide a new class of pharmacologically active chemical compounds possessing high activity against pathogenic protozoa, especially trichomonas.

It was found that products corresponding to the general Formula I can be readily obtained in high yields by condensing a 4-nitroimidazole conforming to the general structural Formula II:

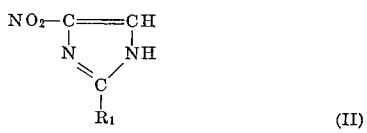

where $R_1$ represents a methyl and a hydroxyalkylating agent selected from the group consisting of styrene oxide and epichlorohydrine, preferably in the presence of a basic condensing agent such a tertiary amine. The condensation can be carried out in the presence or absence of solvent and at temperatures ranging from 0 to about 200° C., depending on the nature of the hydroxy alkylating agent used. The reaction products either precipitate from the reaction mixture on cooling, and are then recovered, as for example by filtration, or are isolated by other known methods, as for example by evaporation of the solvent and crystallization of the product from an appropriate solvent.

The products obtained according to the method of the present invention gave satisfactory values on elementary analysis and exhibited UV maxima at 302 mμ with an ε value of the order of 8500, which is in a good agreement with a crossconjugated chromofore contained in general Formula I, and different from UV maxima of 312 mμ shown by the known fully conjugated 1-substituted-5-nitroimidazoles. Such latter nitroimidazoles are described in United States Patent No. 2,944,061. However, there are significant differences in the nitroimidazoles of the present invention and those described in the patent. For example, while the molecules of the present invention are well soluble in water, those of the said patent are poorly soluble. Consequently, the molecules of the present invention are superior in the formulations of drug specialties incorporating them and are absorbed differently. It should also be noted that the process by which the present molecules are prepared is substantially different from the processes described in United States Patent No. 2,944,061. In this connection it is appropriate to observe that it could not have been foreseen prior to the making of the molecules of the present invention that they would, on the one hand, have different physical characteristics and, on the other hand, that they would nevertheless have uses that are comparable in some respects. Frequently, closely related compounds have entirely different activities, toxicities, and so forth.

The following examples are presented in order to point out more clearly the manner of carrying out the invention, but are not intended to limit its scope beyond that indicated in the claims.

*Example 1*

To a suspension of 127 g. of 2-methyl-4-nitroimidazole in 600 ml. of n-propanol was added a solution of 118 ml. of styrene oxide in 250 ml. of n-propanol and 15 ml. of tri-n-propylamine. The reaction mixture was then heated under reflux for 3 hours. The solvent was partially removed by distillation in vacuo and the crystalline precipitate of 1-(b-hydroxy-b-phenyl)-ethyl-2-methyl-4-nitroimidazole (135 g.) was purified by crystallization from methanol-ethyl acetate mixture. The pure product melted at 162–4° C.

*Example 2*

To a suspension of 127 g. of 2-methyl-4-nitroimidazole in 600 ml. of n-propanol were added 106 ml. of epichlorohydrine and 15 ml. of tri-n-propylamine. After 1.5 hours refluxing the solvent was partially removed by distillation in vacuo and the precipitated crystalline 1-(b-hydroxy-b-chloromethyl)-ethyl-2-methyl-4-nitroimidazole was collected by filtration. The product had a melting point of 151–3° C. after recrystallization from ethanol.

*Example 3*

When the compounds of the present invention are intended to be used in pharmaceutical specialties, they may be incorporated along with common pharmaceutical carriers into tablets, capsules, liquid dispensing forms, suppositories, as for example vaginal suppositories, and the like. In the preparation of orally ingestible forms, as for example tablets, a preferred tablet should contain 250 mg. of the active molecule, although such tablets may be made up containing from 150 to 350 mg. Tablets may be formed with such common diluents or carriers as lactose and/or magnesium stearate. In the case of a suppository, such as for example a vaginal suppository, the range is from 250 to 750 mg. of the active molecule per suppository. An inert suppository base may be employed in preparing such suppositories, as for example, chloroglyceride gelatin base.

The foregoing is to be considered as generally and particularly descriptive of the nature and scope of the present invention without being exhaustive.

What is claimed is:
1. 1 - (b - hydroxy - b - phenyl) - ethyl - 2 - methyl - 4 - nitro-imidazole.
2. 1 - (b - hydroxy - b - chloromethyl) - ethyl - 2 - methyl-4-nitroimidazole.

References Cited by the Examiner
UNITED STATES PATENTS

| | | | |
|---|---|---|---|
| 2,774,769 | 12/1956 | Stempel | 260—309 |
| 2,944,061 | 7/1960 | Jacob | 260—309 |
| 3,010,963 | 11/1961 | Erner | 260—348 |
| 3,024,166 | 3/1962 | Kuna et al. | 167—65 |
| 3,036,955 | 5/1962 | Kuna et al. | 167—65 |
| 3,037,909 | 6/1962 | Rogers et al. | 167—53.1 |
| 3,178,446 | 4/1965 | Sannicolo | 260—309 |

OTHER REFERENCES

A Technical Bulletin on Ethylene Oxide, pp. 15–17 and 21. Houston, Jefferson Chemical Company, 1956.

Hofman: Imidazole and Its Derivatives, Part I, pp. 3–5 and 26–30. New York, Interscience, 1953.

Kiminjima et al.: Chemical Abstracts vol. 43, columns 2021–22 (1949). Abstract of article from Jour. Soc. Chem. Ind. (Japan), vol. 45, pp. 564–8 (1942).

WALTER A. MODANCE, *Primary Examiner.*

NICHOLAS S. RIZZO, *Examiner.*

NATALIE TROUOF, *Assistant Examiner.*